(12) United States Patent
Jones et al.

(10) Patent No.: US 7,996,374 B1
(45) Date of Patent: Aug. 9, 2011

(54) METHOD AND APPARATUS FOR AUTOMATICALLY CORRELATING RELATED INCIDENTS OF POLICY VIOLATIONS

(75) Inventors: Christopher Jones, San Francisco, CA (US); Daren Desjardins, San Francisco, CA (US); Eric Bothwell, San Francisco, CA (US); Alexander Fontana, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 448 days.

(21) Appl. No.: 12/079,660

(22) Filed: Mar. 28, 2008

(51) Int. Cl.
G06F 7/00 (2006.01)
G06F 17/00 (2006.01)

(52) U.S. Cl. ........................................... 707/694

(58) Field of Classification Search .................. 707/694, 707/999.001, 999.009
See application file for complete search history.

(56) References Cited

U.S. PATENT DOCUMENTS

| | | | |
|---|---|---|---|
| 4,858,152 A | 8/1989 | Estes | |
| 5,212,821 A | 5/1993 | Gorin et al. | |
| 5,379,391 A | 1/1995 | Belsan et al. | |
| 5,384,892 A | 1/1995 | Strong | |
| 5,577,249 A | 11/1996 | Califano | |
| 5,739,391 A | 4/1998 | Ruppel et al. | |
| 5,796,948 A | 8/1998 | Cohen | |
| 5,832,212 A | 11/1998 | Cragun et al. | |
| 5,835,722 A | 11/1998 | Bradshaw et al. | |
| 5,883,588 A | 3/1999 | Okamura | |
| 5,884,033 A | 3/1999 | Duvall et al. | |
| 5,892,905 A | 4/1999 | Brandt et al. | |
| 5,958,015 A | 9/1999 | Dascalu | |
| 5,960,080 A | 9/1999 | Fahlman et al. | |
| 5,996,011 A | 11/1999 | Humes | |
| 6,047,283 A | 4/2000 | Braun | |
| 6,055,538 A | 4/2000 | Kessenich et al. | |
| 6,065,056 A | 5/2000 | Bradshaw et al. | |
| 6,073,142 A | 6/2000 | Geiger et al. | |
| 6,094,689 A | 7/2000 | Embry et al. | |
| 6,138,168 A | 10/2000 | Kelly et al. | |
| 6,233,618 B1 | 5/2001 | Shannon | |
| 6,314,190 B1 | 11/2001 | Zimmermann | |
| 6,321,224 B1 | 11/2001 | Beall et al. | |
| 6,347,374 B1 | 2/2002 | Drake et al. | |
| 6,360,215 B1 | 3/2002 | Judd et al. | |

(Continued)

FOREIGN PATENT DOCUMENTS

CA    2 499 508    4/2004

(Continued)

OTHER PUBLICATIONS

Alonso, Omar, et al, Oracle Secure Enterprise Search 10g, An Oracle Technical White Paper, Mar. 2006, 21 pages.

(Continued)

*Primary Examiner* — Mohammad Ali
*Assistant Examiner* — Patrick A Darno
(74) *Attorney, Agent, or Firm* — Lowenstein Sandler PC

(57) ABSTRACT

A method and apparatus for automatically correlating policy violation incidents. In one embodiment, the method includes receiving user input identifying one of policy violation incidents stored in a data repository, where each policy violation incident is associated with one or more attributes. The method further includes automatically correlating the identified policy violation incident with other policy violation incidents that have in common at least one attribute with the identified policy violation incident, and presenting the resulting correlation information to a user.

19 Claims, 8 Drawing Sheets

U.S. PATENT DOCUMENTS

| | | |
|---|---|---|
| 6,374,241 B1 | 4/2002 | Lamburt |
| 6,396,513 B1 | 5/2002 | Helfman et al. |
| 6,442,607 B1 | 8/2002 | Korn et al. |
| 6,442,686 B1 | 8/2002 | McArdle et al. |
| 6,453,338 B1 | 9/2002 | Shiono |
| 6,507,846 B1 | 1/2003 | Consens |
| 6,604,141 B1 | 8/2003 | Ventura |
| 6,618,725 B1 | 9/2003 | Fukuda et al. |
| 6,636,838 B1 | 10/2003 | Perlman et al. |
| 6,639,615 B1 | 10/2003 | Majumdar |
| 6,701,314 B1 | 3/2004 | Conover et al. |
| 6,711,579 B2 | 3/2004 | Balakrishnan |
| 6,714,936 B1 | 3/2004 | Nevin, II |
| 6,732,087 B1 | 5/2004 | Hughes et al. |
| 6,768,986 B2 | 7/2004 | Cras et al. |
| 6,769,032 B1 | 7/2004 | Katiyar et al. |
| 6,778,979 B2 | 8/2004 | Grefenstette et al. |
| 6,779,120 B1 | 8/2004 | Valente et al. |
| 6,829,613 B1 | 12/2004 | Liddy |
| 6,829,635 B1 | 12/2004 | Townsend |
| 6,871,284 B2 | 3/2005 | Cooper et al. |
| 6,941,466 B2 | 9/2005 | Mastrianni et al. |
| 6,965,886 B2 | 11/2005 | Govrin et al. |
| 6,983,186 B2 | 1/2006 | Navani et al. |
| 6,996,788 B2 | 2/2006 | Akiba et al. |
| 7,003,562 B2 | 2/2006 | Mayer |
| 7,114,185 B2 | 9/2006 | Moore et al. |
| 7,130,885 B2 | 10/2006 | Chandra et al. |
| 7,146,402 B2 | 12/2006 | Kucherawy |
| 7,162,738 B2 | 1/2007 | Dickinson, III et al. |
| 7,191,252 B2 | 3/2007 | Redlich et al. |
| 7,222,158 B2 | 5/2007 | Wexelblat |
| 7,237,008 B1 | 6/2007 | Tarbotton et al. |
| 7,249,175 B1 | 7/2007 | Donaldson |
| 7,320,004 B1 | 1/2008 | DeLuca et al. |
| 7,472,114 B1 | 12/2008 | Rowney et al. |
| 7,516,492 B1 | 4/2009 | Nisbet et al. |
| 7,523,498 B2 | 4/2009 | Fellenstein et al. |
| 7,756,843 B1* | 7/2010 | Palmer ............... 707/694 |
| 2001/0037324 A1 | 11/2001 | Agrawal et al. |
| 2002/0010679 A1 | 1/2002 | Felsher |
| 2002/0069098 A1 | 6/2002 | Schmidt |
| 2002/0073313 A1 | 6/2002 | Brown et al. |
| 2002/0093676 A1 | 7/2002 | Parry |
| 2002/0129140 A1 | 9/2002 | Peled et al. |
| 2002/0138579 A1 | 9/2002 | Goldberg |
| 2002/0178228 A1 | 11/2002 | Goldberg |
| 2002/0198766 A1 | 12/2002 | Magrino et al. |
| 2002/0199095 A1 | 12/2002 | Bandini et al. |
| 2003/0051026 A1 | 3/2003 | Carter et al. |
| 2003/0093518 A1* | 5/2003 | Hiraga ............... 709/224 |
| 2004/0039991 A1 | 2/2004 | Hopkins et al. |
| 2004/0225645 A1 | 11/2004 | Rowney et al. |
| 2005/0027723 A1 | 2/2005 | Jones et al. |
| 2005/0060537 A1 | 3/2005 | Stamos et al. |
| 2005/0086252 A1 | 4/2005 | Jones et al. |
| 2005/0138110 A1 | 6/2005 | Redlich et al. |
| 2005/0182765 A1 | 8/2005 | Liddy |
| 2005/0216771 A1 | 9/2005 | Malcolm |
| 2005/0257267 A1* | 11/2005 | Williams et al. ......... 726/25 |
| 2006/0005247 A1 | 1/2006 | Zhang et al. |
| 2006/0184549 A1 | 8/2006 | Rowney et al. |
| 2006/0224589 A1 | 10/2006 | Rowney et al. |
| 2007/0130255 A1 | 6/2007 | Wolovitz et al. |
| 2007/0261099 A1* | 11/2007 | Broussard et al. ......... 726/1 |
| 2008/0066150 A1 | 3/2008 | Lim et al. |
| 2008/0235760 A1* | 9/2008 | Broussard et al. ......... 726/1 |
| 2010/0169970 A1* | 7/2010 | Stolfo et al. ........... 726/22 |
| 2010/0332481 A1 | 12/2010 | Rowney |

FOREIGN PATENT DOCUMENTS

| | | |
|---|---|---|
| CA | 2 597 083 | 8/2006 |
| GB | 2 343 030 A | 4/2000 |
| GB | 2466367 A | 6/2010 |
| JP | 2002-189643 | 5/2002 |
| JP | 2005-539334 | 12/2005 |
| JP | 2008-171101 | 7/2008 |
| JP | 2008-537195 | 9/2008 |
| WO | WO2004/027653 | 4/2004 |
| WO | WO2006/088952 | 8/2006 |

OTHER PUBLICATIONS

Attenex, Attenex Patterns Suite, http://www.attenex.com/products_services/attenex_patterns_suite.aspx, Downloaded Feb. 20, 2008, 2 pages.

Autonomy, Autonomy Group product overview, http://www.autonomy.com/content/products/index.en.html, Downloaded Feb. 20, 2008, 2 pages.

Autonomy, Security, http://www.autonomy.com/content/Technology/Technology_Benefits/security, Feb. 20, 2008, 2 pages.

Autonomy, Technology overview, http://www.autonomy.com/content/Technmology/index.en.html, Downloaded Feb. 20, 2008, 2 pages.

Autonomy, Limitations of Other Approaches, http://www.autonomy.com/content/Technology/Limitations_Other_Approaches, Downloaded Feb. 20, 2008, 2 pages.

Buchta, Stefan, Oracle Secure Enterprise Search Version 10.1.8.2, An Oracle Technical White Paper, Oct. 2007, 30 pages.

CISCO, A Report from Ironport Systems, "Data Loss Prevention Best Practices—Managing Sensitive Data in the Enterprise", 2007, 21 pages.

Clearwell Systems, The Clearwell E-Discovery Platform®, http://www.clearwellsystems.com/products/e-discovery-platform, Downloaded Feb. 20, 2008 2 pages.

Clearwell Systems, The Clearwell E-Discovery Platform: Analysis, http://www.clearwellsystems.com/products/e-discovery-analysis.php, Downloaded Feb. 20, 2008, 1 page.

Clearwell Systems, The Clearwell E-Discovery Platform: Case Management, http://www.clearwellsystems.com/products/e-discovery-case-management, Downloaded Feb. 20, 2008 2 pages.

Clearwell Systems The Clearwell E-Discovery Platform: Processing, http://www.clearwellsystems.com/products/e-discovery-processing.php, Downloaded Feb. 20, 2008, 2 pages.

Clearwell Systems The Clearwell E-Discovery Platform: Review, http://www.clearwellsystems.com/products/e-discovery-review.php, Downloaded Feb. 20, 2008 2 pages.

Clearwell Systems The Clearwell E-Discovery Platform: Search &Cull-Down, http://www.clearwellsystems.com/products/e-discovery-search-cull.php, Downloaded Feb. 20, 2008 1 page.

Dale, et al., "Programming and Problem Solving with C++," 2002, Jones and Bartlett Publishers, 3rd Edition, pp. 653-662.

Deitel, et al., "C++-How to Program," 2001, Prentice Hall, 3rd Edition, pp. 273-279 fast, Fast ESP Revitalizing your search experience with intelligent, user-centric search, 2007, Fast Search & Transfer ASA. , 6 pages.

Google, Google Search Appliance, http://www.google.com/enterprise/gsa/, Downloaded, Feb. 20, 2008, 2 pages.

Guidance Software, EnCase® eDiscovery Suite, http://www.guidancesoftware.com/products/ediscovery_index.aspx, Downloaded Feb. 20, 2008, 2 pages.

Kaufman, et al., "Network Security-Private Communication in a Public World," 1995, Prentice, Hall PTR, p. 80.

Koch, et al., "Oracle8-The Complete Reference," 1997, Osborn McGraw-Hill, pp. 9-7 and 51-62.

Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.

Oracle Secure Enterprise Search 10G, Mar. 2006, 8 pages.

Oracle8™ M Tuning, Release 8.0, Dec. 1997, Oracle®.

PCT Search Report PCT /US03/30178 dated Mar. 11, 2004, 5 pages.

PCT Search Report PCT /US06/5317 dated Jul. 24, 2006, 5 pages.

Zantaz, Enterprise Archive Solution (EAS) Product family, Datasheet, 4 pages.

Office Action for U.S. Appl. No. 10/247,002 mailed Mar. 3, 2006.
Office Action for U.S. Appl. No. 10/247,002 mailed Aug. 21, 2006.
Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.

Office Action for U.S. Appl. No. 10/247,002 mailed Jun. 18, 2008.
Office Action for U.S. Appl. No. 10/247,002 mailed Nov. 25, 2008.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.
Notice of Allowance for U.S. Appl. No. 10/431,145 mailed Aug. 20, 2008.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of for U.S. Appl. No. 10/833,538 mailed Aug. 6, 2008.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 10/892,615 mailed Dec. 5, 2008.
Office Action for U.S. Appl. No. 11/057,988 mailed Aug. 18, 2008.
Office Action for U.S. Appl. No. 11/058,551 mailed Sep. 9, 2008.
GB0921722.5 Search Report dated Mar. 26, 2010, 1 page.
Office Action for U.S. Appl. No. 10/247,002 mailed May 21, 2009.
Office Action for U.S. Appl. No. 10/247,002 mailed Dec. 31, 2009.
Notice of Allowance for U.S. Appl. No. 10/431,145 mailed Jun. 5, 2009.
Office Action for U.S. Appl. No. 10/607,718 mailed Nov. 14, 2008.
Office Action for U.S. Appl. No. 10/607,718 mailed May 1, 2009.
Office Action for U.S. Appl. No. 10/607,718 mailed Nov. 9, 2009.
Office Action for U.S. Appl. No. 10/607,718 mailed Apr. 12, 2010.
Office Action for U.S. Appl. No. 10/607,718 mailed Aug. 17, 2010.
Office Action for U.S. Appl. No. 10/892,982 mailed Feb. 12, 2009.
Office Action for U.S. Appl. No. 10/892,982 mailed Jul. 20, 2009.
Office Action for U.S. Appl. No. 10/892,982 mailed Jan. 6, 2010.
Office Action for U.S. Appl. No. 10/892,615 mailed May 12, 2009.
Office Action for U.S. Appl. No. 10/892,615 mailed Mar. 24, 2010.
Advisory Action for U.S. Appl. No. 10/892,615 mailed Jul. 2, 2010.
Office Action for U.S. Appl. No. 11/057,988 mailed Jan. 28, 2009.
Office Action for U.S. Appl. No. 11/057,988 mailed Jul. 10, 2009.
Office Action for U.S. Appl. No. 11/057,988 mailed Mar. 18, 2010.
Office Action for U.S. Appl. No. 11/058,551 mailed Mar. 20, 2009.
Office Action for U.S. Appl. No. 11/058,551 mailed Sep. 11, 2009.
Office Action for U.S. Appl. No. 11/058,551 mailed Mar. 8, 2010.
Office Action for U.S. Appl. No. 11/058,551 mailed Aug. 2, 2010.
Office Action for U.S. Appl. No. 12/179,630 mailed Aug. 31, 2010.
Office Action for U.S. Appl. No. 10/607,718 mailed Feb. 3, 2011.
Office Action for 10/892,982 mailed Jul. 20, 2009.
Office Action for 11/057,988 mailed Jan. 28, 2009.
Office Action for 11/057,988 mailed Mar. 18, 2010.
Office Action for U.S. Appl. No. 12/079,719 mailed Jan. 21, 2011.

* cited by examiner

FIG. 5B

GUI 550

Incident List

Filter
Date: All Dates
Status: Equals All

Report Run 2/29/08 – 3:52 PM
Edit | Report ▼
Show all

Totals:
| Total | High | Med | Low | Info | Matches |
|---|---|---|---|---|---|
| 19 | 10 | 0 | 0 | 9 | 19 |

553

Incidents
Dec 11 2007 to Today

554

Incident actions 1-19 of 19 | Show all | Select all

| Type | Subject/Sender/Recipient(s) | Date/Time of Detection | ID/Policy | Matches | Severity | Status |
|---|---|---|---|---|---|---|
| ☐ ☒ | Subject Test 12<br>Sender IGotBounced@td10.test.lab<br>Recipient Fineberg@test.lab | 1/3/08 – 10:25 AM | 00000037<br>All email policy | 1 | H | New |
| ☐ ☒ | Subject Test 12<br>Sender IGotBounced@td10.test.lab<br>Recipient Fineberg@test.lab | 1/3/08 – 10:25 AM | 00000038<br>Ernie's Keyword policy | 1 | L | New |
| ☐ ☒ | Subject Test 11<br>Sender IGotBounced@td10.test.lab<br>Recipient Fineberg@test.lab | 1/3/08 – 10:16 AM | 00000035<br>All email policy | 1 | H | New |
| ☐ ☒ | Subject Test 11<br>Sender IGotBounced@td10.test.lab<br>Recipient Fineberg@test.lab | 1/3/08 – 10:16 AM | 00000036<br>Ernie's Keyword policy | 1 | L | New |
| ☐ ☒ | Subject Test 10<br>Sender IGotBounced@td10.test.lab<br>Recipient Fineberg@test.lab | 1/3/08 – 9:55 AM | 00000033<br>All email policy | 1 | H | New |

552 → Generated List 551

METHOD AND APPARATUS FOR AUTOMATICALLY CORRELATING RELATED INCIDENTS OF POLICY VIOLATIONS

TECHNICAL FIELD

Embodiments of the invention relate to the field of processing data; more specifically, to automatically correlate an identified incident with other incident that have in common at least one attribute with the identified policy violation incident.

BACKGROUND

A modern organization typically maintains a data storage system to store and deliver records concerning various significant business aspects of the organization. Stored records may include data on customers (or patients), contracts, deliveries, supplies, employees, manufacturing, etc. A data storage system of an organization usually utilizes a table-based storage mechanism, such as relational databases, client/server applications built on top of relational databases (e.g., Siebel, SAP, etc.), object-oriented databases, object-relational databases, document stores and file systems that store table formatted data (e.g., CSV files, Excel spreadsheet files, etc.), password systems, single-sign-on systems, etc.

Table-based storage systems typically run on a computer connected to a local area network (LAN). This computer is usually made accessible to the Internet via a firewall, router, or other packet switching devices. Although the connectivity of a table-based storage system to the network provides for more efficient utilization of information maintained by the table-based storage system, it also poses security problems due to the highly sensitive nature of this information. In particular, because access to the contents of the table-based storage system is essential to the job function of many employees in the organization, there are many possible points of possible theft or accidental distribution of this information. Theft of information represents a significant business risk both in terms of the value of the intellectual property as well as the legal liabilities related to regulatory compliance. In order to prevent malicious and unintentional data breaches, commercial and government regulations often impose restrictions on how confidential data may be stored, the format of confidential data, who can access that confidential data, as well as whether confidential data may be transmitted (e.g., by email). In order to comply with these regulations, companies create policies to govern how confidential data is stored in the various applications, in what format the confidential information is stored, who can access that confidential data, and to prevent transmission of confidential data. In order to implement these policies, conventional systems can detect policy violations, however, each policy violation is treated as an individual incident and recorded individually.

For example, for each recorded policy violation, typically an administrator would manually try and find out what happened to cause each of the policy violations, and subsequently perform remediation duties required by the policy for each of the policy violations. Although the administrator can manually correlate multiple policy violations by manually identifying similarities between the multiple policy violations, this process may be very inefficient, especially for a large number of policy violations. Also, by manually correlating the policy violations, it may be very difficult to correlate policy violations that occur as part of a related set of events. For example, an email exchange involving many emails could generate multiple policy violations over time, however, the administrator may attempt to remediate each of the generated policy violations individually, unless the administrator manually identifies that these policy violations are part of a single set of events. Since administrators need to be able to identify abnormal patterns of policy-violating behavior, the process of manual correlations is a cumbersome process that consumes a lot of time to identify similarities between various policy violations. This problem may be compounded with the time between the possibly related policy violations. For example, it may be very difficult to manually correlate policy violations that have occurred in different moments of time, such as twenty days between policy violations. In addition, for cases that require immediate remediation, manual correlation by an administrator may be not fast enough to identify the policy violations as being related for immediate remediation. For example, manual correlation may not be efficient in a scenario where a given user commits many policy violations within a short time period.

There are conventional security-oriented network monitoring products that attempt to deal with event correlation, however, these conventional solutions tend to be focused on correlating repeated sequences of events, such as non-policy-violating events, rather than finding multiple incidents with similar attributes. Moreover, none of these conventional solutions deal with policy violations, such as violations of data loss prevention policies.

SUMMARY

A method and apparatus for automatically correlating an identified policy violation incident with other policy violation incidents that have in common at least one attribute with the identified policy violation incident. In one embodiment, the method generates a list of the attributes of the identified policy violation incident, and for each of the attributes, generates a count of the number of other policy violation incidents that have in common the particular attribute with the identified policy violation incident.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5B is an exemplary GUI that illustrates the generated list of incidents that are similar to a given incident along the time axis and attribute axis, according to one embodiment.

DETAILED DESCRIPTION

Figure 1:
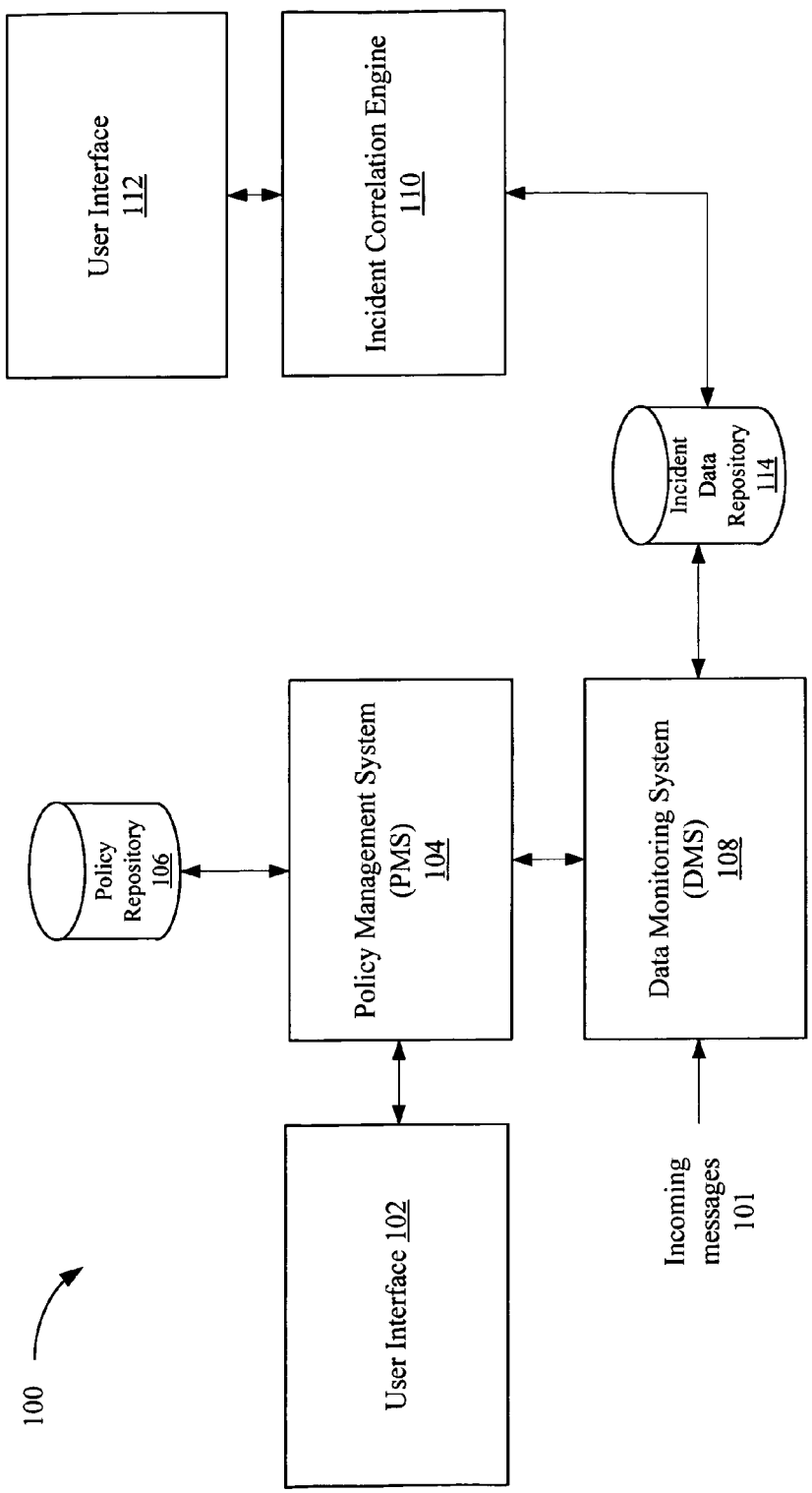
FIG. 1 is a block diagram of one embodiment of a system for automatically correlating multiple incidents that have at least one common attribute.

A method and apparatus for automatically correlating policy violation incidents that have at least one common attribute. Policy violation incidents may concern a wide variety of policies including, for example, data loss prevention policies, spam prevention policies, virus prevention policies, hacking prevention policies, etc. In one embodiment, a user interface is provided to specify policy violation incidents that are similar to a given policy violation incident. For each axis of similarity, the number of similar violations and a list of the similar violations may be generated for the user. The user interface may also list violations which are similar to a given policy along several axes of similarity. The above correlation information allows an administrator to quickly remediate policy violations, without having to manually determine what caused each of the policy violations. For example, an email exchange involving many emails could cause multiple policy violations, however, an administrator does not need to remediate each policy violation individually. Instead, the administrator can view correlation information associated with the email exchange, and can remediate all of the detected policy violations surrounding the email exchange as a single set of related events.

In addition, the above correlation information allows administrators to more easily recognize abnormal patterns of policy-violating behavior. For example, if a given user commits many policy violation incidents within a short time period, the administrator might respond to these particular types of policy violation incidents differently than policy violation incidents that occur over a greater period of time. In addition, automatic incident correlation may help identify patterns that denote either broken business processes or malicious intent (e.g., an abnormally large number of policy violation incidents that have occurred on a single file server, that were caused by a single user, that have occurred between the same sender and recipient, etc.)

Since automatic remediation and workflow are important factors in the cost of remediating any given policy violation incident, automatic incident correlation decreases the cost of remediation by reducing the human-effort required to remediate policy violation incidents. In addition, the correlation information presented to an administrator allows the administrator better understand the vulnerabilities in the organization's business processes and take appropriate actions.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram formats in order to avoid unnecessarily obscuring the present invention. Thus, the specific details set forth are merely exemplary. Particular implementations may vary from these exemplary details and still be contemplated to be within the spirit and scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of one embodiment of a system 100 for automatically correlating policy violation incidents. The system 100 includes a policy management system (PMS) 104, a policy repository 106, a data monitoring system (DMS)

108, an incident correlation engine 110, and an incident data repository 114 (also referred to as an incident data store).

The user interface 102 is provided by the PMS 104 to facilitate user input pertaining to policies, such as pre-configured template policies or customized policies, source data to be protected by a policy, or other policy parameters, such as policy rules and logical connectives between the rules. In one embodiment, the PMS 104 receives the policy parameters via the user interface 102, defines the policy based on the user input, and stores the policies in the policy repository 106. In another embodiment, the PMS 104 receives the policy parameters from an Application Programming Interface (API) or via a configuration file formatted in text or a defined data format (e.g., extensible markup language (XML) or binary format).

In one embodiment, the policy includes a set of rules that specify which information should be present in a message to trigger a violation. The set of rules may specify specific conditions (e.g., a sender or recipient identifier pattern, a protocol to carry messages, a destination of the message posted for public discussion (e.g., a specific newsgroup name), or the like) that when present in a message trigger a violation, whether the conditions apply to the characteristics of the entire message, characteristics of the components of the message, or characteristics of message attachments (e.g., a message attachment type or size, a file attachment name, or the like). In yet other embodiments, the policy includes rules requiring that the message contain a specific keyword(s) or an expression matching a specific regular expression pattern. In one embodiment, the rules in the policy are combined using logical connectives of first-order logic (e.g., AND, OR, NAND, NOR, NOT, equivalent, nonequivalent, or the like). It should noted that messages being examined for policy violations include messages being transmitted (e.g., email message, instant messages, etc.), as well as messages being stored in databases, caches, etc.

The policy repository 106 may store policy templates configured based on regulations concerning handling of sensitive information maintained by an organization. These regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. In another embodiment, the policy repository 106 stores policies that are not templates, but have been configured based on corporate data governance policies. In one embodiment, the policy templates or customized policies are pre-configured based on input provided by individuals familiar with the relevant regulations, and stored on a server (not shown).

The DMS 108 is responsible for monitoring the incoming messages 101 based on the information received from the PMS 104 (e.g., policies) to detect policy violation incidents. For example, the DMS 108 may be responsible for monitoring messages sent over the network (e.g., email messages, messages posted on the Internet for public discussion, or the like.), as well as data processed by personal computing devices, and data stored on data storage media of personal computing devices such as portable computers, desktop computers, Personal Digital Assistants, cell-phones, or the like.

Once the DMS 108 has detected a policy violation incident, the policy violation incident is stored in the incident data repository 114.

In one embodiment, the incident correlation engine 110 is configured to access data stored in the incident data repository 114 that stores data regarding multiple policy violation incidents, as described below. In one embodiment, the incident correlation engine 110 resides on a server or a workstation and connects to the incident data repository 114 over a computer network that communicates any of the standard protocols for the exchange of information. Alternatively, the incident correlation engine 110 can reside on the machine that manages the incident data repository 114. In one embodiment, the incident correlation engine 110 is part of the PMS 104. In another embodiment, the incident correlation engine 110 is part of the DMS 108. Alternatively, the incident correlation engine 110 may be part of an independent system from the PMS 104 and the DMS 108, such as part of an administrative or management console. In another embodiment, multiple incident correlation engines 110 are implemented at different locations to provide scalability and/or protect multiple possible points of egress of information, as well as multiple points of data storage. In another embodiment, multiple incident correlation engines 110 are used for parallel access to the policy violation incidents stored in the incident data repository 114.

In one embodiment, the incident correlation engine 110 receives user input via a user interface 112. The user input may identify one of the multiple policy violation incidents stored in the incident data repository 114, a given time period, and/or one or more attributes of the identified policy violation incident. In one embodiment, the user interface 112 displays a list of the attributes of the identified policy violation incident, and presents, for each of the attributes, a count of the number of other policy violation incidents (e.g., generated by the correlation engine 110), which have in common the particular attribute with the identified policy violation incident. The user interface 112 may also provide a link for each of the counts, and display a list of the other policy violation incidents (e.g., generated by the incident correlation engine 110) corresponding to the count when the link for the particular count is activated.

Although system 100 includes two user interfaces, user interfaces 102 and 112, alternatively, the user interfaces 112 and 102 may be implemented as a single user interface that facilitates user input regarding policies, as well as user input regarding the automatic correlation of policy violation incidents.

As discussed above, the user interface 112 enables an administrator to look for incidents with similar characteristics. For example, the administrator may see all incidents from the same employee, all incidents where the sender and recipient are the same, or the like. In one embodiment, the user interface 112 allows an administrator to open an incident, and then shows a set of links related to incidents pertaining to the open incident. These links may show, for example, how many times the sender has generated an incident in the last day, 7 days, 30 days.

In one embodiment, the user interface 112 also allows an administrator to detect email threads exposing the same data again and again. In particular, an administrator may select, in the user interface, an incident with the subject "The list we talked about." In response, the incident correlations section of the user interface may present a collection of links to related reports about this incident, including messages with a similar subject. Also, in the incident correlations section, a count for each of the links is displayed, linking to reports that include the related incidents for the particular property. The administrator notices five messages with a similar subject (e.g., "Re: The list we talked about") in the last twenty-four hours, but none in the last 7 days or 30 days. The administrator may activate the link, resulting in the user interface displaying a list of the five incidents, which allows the administrator to notice the five incidents are all from the same sender to the same recipient. In one click of the link, the administrator has collected five messages in an email thread that has exposed the same data each time the sender replied. After having identified these incidents as being related to a single set of events, the administrator can easily follow up with all of these reported incidents at once in a single remedial action, instead of multiple remedial actions for each individual incident. For example, the administrator can send one email to the sender to indicate that the sender has exposed data each time the sender replied to the recipient and to remove the exposed data from any future correspondence, or the like.

The user interface 112 may provide a list, generated by the incident correlation engine 110, which lists a set of key attributes that are used to correlate to other possible incidents. Different incident types may have slightly different list of attributes. This list may correspond to the incident headers, which are representative of the type of different incidents. For each attribute, the user interface may display the number of incidents generated with that same attribute value within one or more periods of time, for example, 1 day, 7 days, and 30 days. Table 1-1 includes exemplary incident headers corresponding to the list of correlation attributes of a given correlation incident. Table 1-1 includes the attribute types in the rows that correspond to the available types of headers (e.g., types of incidents) in the columns. For example, the correlation attribute of sender may be included when the detected policy violation incident has the header type of HTTP, IM, SMTP, NNTP, uTCP, FTP, and removable media. However, the correlation attribute of Subject may be included only when the detected policy violation incident has a header type of SMTP or NNTP.

ever, the PMS 104, DMS 108, and incident correlation engine 110 may be incorporated into the same physical or logical system. In another embodiment, the PMS 104, DMS 108, and incident correlation engine 110 may not necessarily reside on the same LAN. The PMS 104 may reside on the same LAN as the incident correlation engine 110, but the DMS 108 may reside on a different LAN which is separated from the LAN on which PMS 104 resides. In this configuration, the two distinct LANs may ultimately be coupled together via the Internet but separated by firewalls, routers, and/or other network devices. This is an advantageous configuration for the case where a company specifically wants to restrict another company that needs their database data (such as a law firm or marketing agency) from violating the first company's database data policy.

In another embodiment, the system 100 is directed to monitoring information content residing on a personal computing device of a user to detect user operations that may involve potential misuse of data (e.g., saving or accessing restricted source data on any storage device on the computing system, using restricted source data in an application, printing restricted source data, using restricted source data in any network communication protocol, or the like). In this configuration, the PMS component of the system 100 may reside on a server and the DMS component of the system 100 may reside on a device coupled to the server via a public network (e.g., the Internet) or a private network (e.g., LAN). Alternatively, the system 100 may be implemented in other configurations, such as hosted configurations, distributed configurations, centralized configurations, or the like.

Although the embodiments described above include description of the PMS 104, the policy repository 106, and the DMS 108, which monitors the incoming messages 101 for policy violation incidents and stores any detected policy violation incidents in the incident data repository 114, these components are not necessary for performing automatic correlation. The automatic correlation may be performed using the incident correlation engine 110, which accesses policy

TABLE 1-1

| Attribute | HTTP | IM | SMTP | NNTP | uTCP | FTP | File Shares | Removable Media |
|---|---|---|---|---|---|---|---|---|
| Sender | X | X | X | X | X | X | | X |
| Recipient(s) | X | X | X | X | X | X | X | X |
| User | | | | | | | | X |
| From IP | X | X | | | X | X | | |
| To IP | X | X | | | X | X | | |
| Location | | | | | | | X | X |
| Subject | | | X | X | | | | |
| Attachment/Files | X | X | X | X | | X | X | X |
| Names (including extensions) | X | | X | X | | X | X | X |

In one embodiment, the automatic correlations may include two types of datapoints: a default set of pre-determined attributes (e.g., attributes that apply to most incidents) and a set of optional properties which correspond to specific types of attributes. In another embodiment, the automatic correlations may be performed on only pre-determined attributes for a given policy violation incident. Alternatively, the automatic correlations may be performed on user-defined attributes for a given policy violation incident.

In one embodiment, the PMS 104, the DMS 108, and the incident correlation engine 110 are coupled to a computer network that communicates any of the standard protocols for the exchange of information. In one embodiment, the three subsystems (PMS 104, DMS 108, and incident correlation engine 110) run on one Local Area Network (LAN). How-violation incidents stored in the incident repository 114 and provides correlation information via a user interface. That is, in other embodiments, the policy violation incidents may be detected by other types of systems, so long as the other types of systems store the detected policy violation incidents for retrieval by the incident correlation engine 110.

Figure 2:
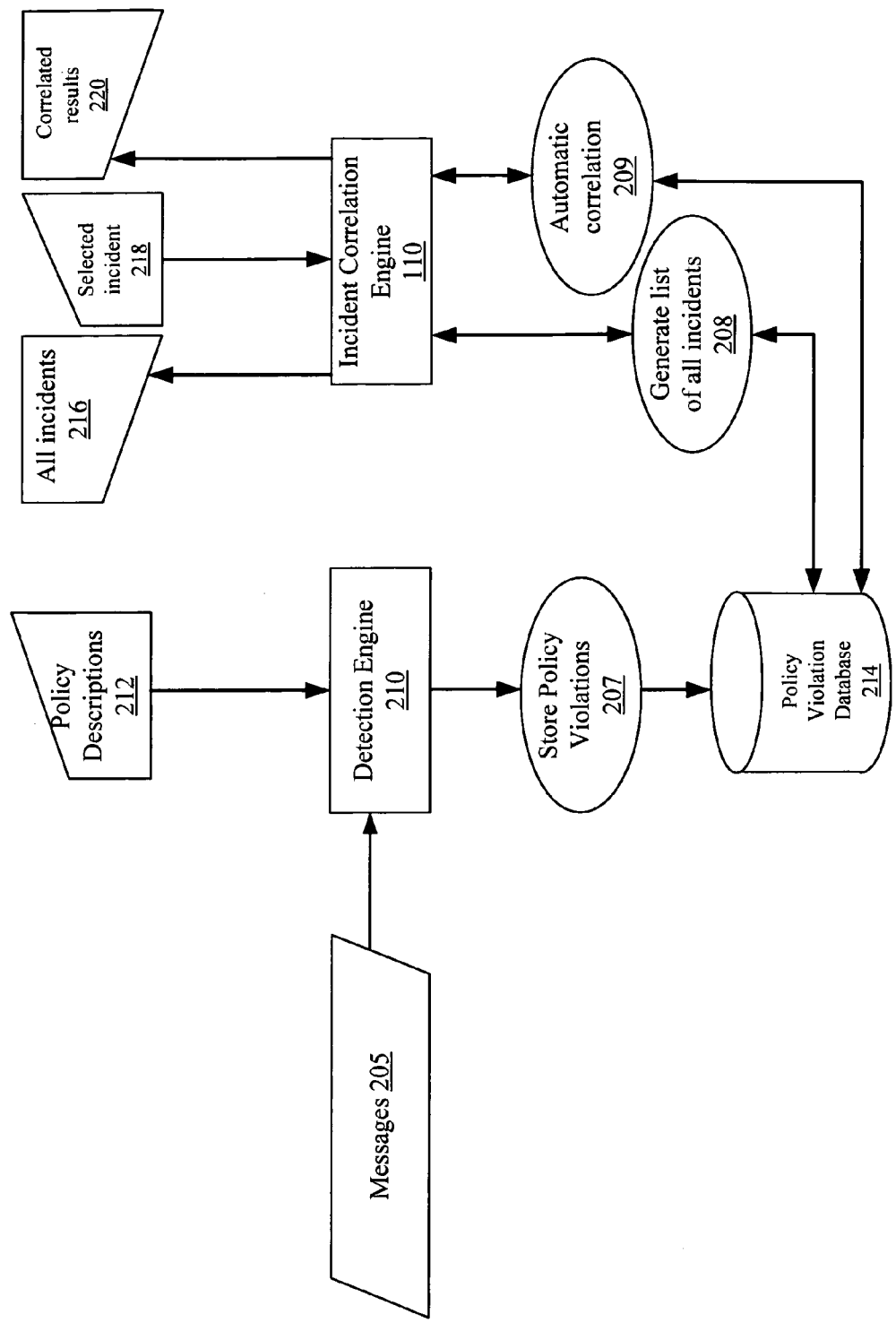
FIG. 2 is a component interaction diagram of one embodiment of the system of FIG. 1 for automatically correlating the identified policy violation incident with other policy violation incidents that are similar to the identified policy violation incident along the time axis and at least one attribute axis.

FIG. 2 is a component interaction diagram of one embodiment of the system of FIG. 1 for automatically correlating the identified policy violation incident with other policy violation incidents that are similar to the identified policy violation incident along the time axis and at least one attribute axis. The detection engine 210 receives and monitors messages 205 for policy violations. Messages 205 may include messages being transmitted over a network (e.g., content traveling over network infrastructure) or messages stored in databases, caches, etc. and retrieved by the detection engine 210. The detection engine 210 may use various algorithms to detect whether the message 205 contains a policy violation or not. Exemplary detection algorithms are referred to herein as Described Content Matching (DCM), Exact Data Matching (EDM), and Index Data Matching (IDM).

The EDM detection algorithm may detect structured data; that is, data stored in databases and other tabular formats. Structured data may include, for example, customer, employee, patient, pricing information, or the like. EDM detection algorithm may allow a policy authors to manage fingerprints of protected data to be matched against information that is copied, stored, or sent. The EDM detection algorithm can find entire records (rows), partial rows, or individual cells of data that are inappropriately exposed.

The IDM detection algorithm may detect unstructured data stored in documents from file systems or other document repositories. The unstructured data may include, for example, design plans, source code, CAD drawings, financial reports, and any other sensitive or proprietary information stored in documents. IDM detection algorithm may allow policy authors to manage fingerprints of protected documents to be matched against information that is copied, stored, or sent. The IDM detection algorithm can find full binary matches of documents or partial matches including extracts, versions, or derivatives.

The DCM detection algorithm detects all types of data in cases where it is impossible or impractical to fingerprint the information to be protected. The DCM detection algorithm uses a combination of lexicons, pattern matching, contextual validation, and file and message attribute information to find confidential data.

The detection engine 210 may use any of the detection algorithms described herein, or alternatively, other types of detection algorithms known by those of ordinary skill in the art. In addition, the detection engine 210 may analyze the context in which the particular sensitive content appears. Context refers to any information about the message or file under analysis other than the content itself. Elements of context may include the sender, recipients, logged-in user, protocol of communication, language, file type, or the like. Some elements of context change depending on the data loss threat; for example, "senders" and "recipients" only make sense for network data loss prevention and have no meaning for endpoint data loss prevention. Other pieces of context hold true across the board; "file type" and "language" have meaning for any type of data loss detection. The context may reveal how data is being stored or moved and can completely change the outward appearance of the data. This may completely change the seriousness of a data loss incident or determine whether there was an incident at all. For example, a confidential design document sent to an outsourcing partner may be part of a normal business process, but that same document sent to a competitor is a critical data loss event. Because the same data can look vastly different, the detection engine 210 may be configured to scan different languages, encryption methods, and file formats.

Once the detection engine 210 detects a policy violation incident, the detection engine 210 stores the policy violation incident in the policy violation database 214, operation 207. The policy violation incidents may be stored in the policy violation database 214 for later retrieval by an administrator to analyze the policy violation incident and possibly remediate the policy violation incident, described below. The detection engine 210 may continuously monitor messages 205 and store the policy violation incidents in the policy violation database 214.

The incident correlation engine 110 can access the policy violation database 214. The incident correlation engine 110 can generate a list of all policy violation incidents, operation 208, and display the list to the user through a user interface, operation 216. To generate the list of all policy violation incidents, the incident correlation engine 110 accesses the policy violation incidents stored in the policy violation database 214. It should be noted that the list may include all or less than all policy violation incidents, and may also be filtered using one or more pre-configured parameters, or user-defined parameters. Once the list of all policy violation incidents is displayed to the user, the user can select one of the policy violation incidents from the list, and the incident correlation engine 110 receives the user input through the user interface, operation 218. Using the identified policy violation incident, the incident correlation engine 110 can perform automatic correlation, operation 209, to correlate the identified policy violation incident with other policy violation incidents that are similar to the identified policy violation incident along the time axis and/or at least one attribute axis, as described below. The incident correlation engine 110 performs the automatic correlation by accessing and searching the policy violation incidents stored in the policy violation database 214. Once the automatic correlation is performed, the incident correlation engine 110 can display the correlated results to the user through the user interface, operation 220.

Although the embodiments described above are directed to automatic correlation of the policy violation incidents that are similar to the identified policy violation incident along the time axis and at least one attribute axis, in other embodiments, the components of FIG. 2 may be used to automatically correlate other types of incidents along only one or more attribute axes, as described herein.

Figure 3:
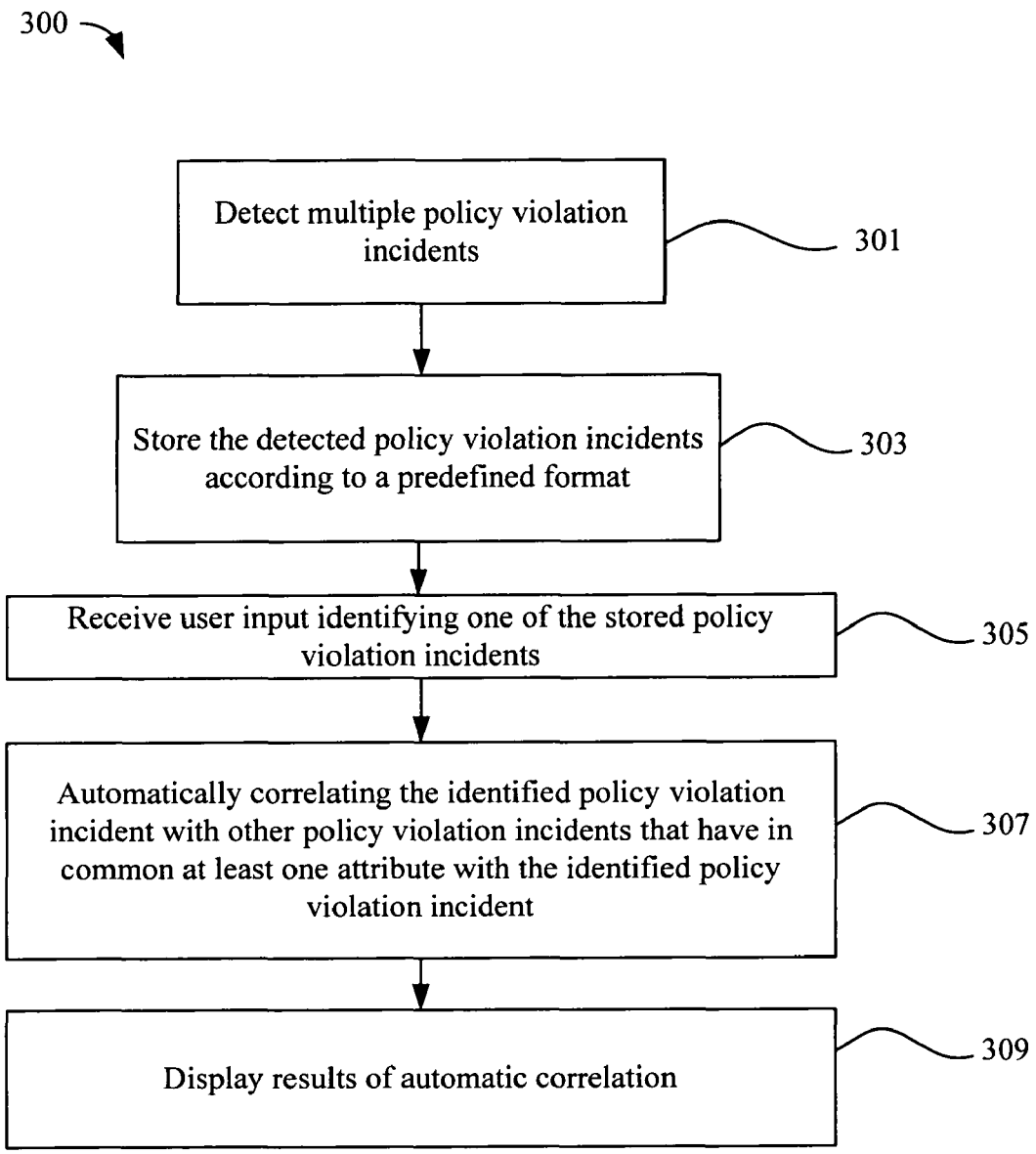
FIG. 3 is a flow diagram of one embodiment of a method for automatically correlating an identified policy violation incident with other policy violation incidents that have at least one common attribute.

FIG. 3 is a flow diagram of one embodiment of a method 300 for automatically correlating an identified policy violation incident with other policy violation incidents that have at least one common attribute. The method is performed by processing logic that may comprise hardware (circuitry, dedicated logic, etc.), software (such as is run on a general purpose computer system or a dedicated machine), or a combination of both. In one embodiment, the method 300 is performed by a policy violation detection system (e.g., system 100 of FIG. 1).

Processing logic begins with detecting multiple policy violation incidents (block 301) and storing the detected policy violation incidents according to a predefined format (block 303). The policy violation incident may be triggered by a misuse or breach of storing, transmitting, accessing sensitive information, such as confidential data. Confidential data may include personally identifiable information (PII) (which may expose identities of patients or customers), intellectual property (e.g., design documents, source code, customer lists, or the like), corporate data such as sensitive marketing plans and financial statements, previously classified data and documents, and other sensitive data, such as social security numbers, credit card numbers, marketing plans, product pricing, schedules, of the like. The confidential data may be located on servers, desktops, and laptops, copied to removable storage devices, such as Universal Serial Bus (USB) drives, CD-ROMs, or the like, downloaded to local drives, transmitted within an organization's LAN, transmitted outside of the organization's LAN, or the like. Alternatively, the policy violation incident may also be triggered by other events, such as by unauthorized access to the resources within the network, spam events, virus events, or the like. For example, the DMS 108 may monitor machines within a LAN for viruses, and for each detected virus, store a policy violation incident in the incident data repository 114. In one embodiment, the operations at blocks 301 and 303 may be performed by the DMS 108 of FIG. 1.

Next, the processing logic receives user input identifying one of the stored policy violation incidents (block 305). Once the processing logic has received the user input, the processing logic automatically correlates the identified policy violation incident with other policy violation incidents that have in common at least one of the attributes with the identified policy violation incident (block 307). In one embodiment, for each of the attributes of the identified policy violation incident, the processing logic, as part of the automatic correlation, generates a count of the number of other policy violation incidents that have in common a particular attribute with the identified policy violation incident. In another embodiment, the processing logic receives user input specifying correlation parameters, such as which particular attributes to be included in the correlation, and subsequently generates a count of the number of other policy violation incidents that satisfy the specified correlation parameters, or a list of the other policy violations that satisfy the specified correlation parameters. Once the processing logic has performed the automatic correlation, the processing logic displays the results of the automatic correlation (block 309). In one embodiment, the operations at blocks 305-309 are performed by the incident correlation engine 110 of FIG. 1.

Upon displaying the results of the automatic correlation, the processing logic may receive a user request to display a list of the other policy violations that correspond to a particular count (e.g., administrator clicks a link that corresponds to the count), and then automatically generate the list of the policy violation incidents to be displayed in the user interface. In another embodiment, the processing logic receives a user request to find similar incidents according to one or more user-identified attributes, and automatically generates a list of the similar incidents that have in common the user-identified attributes with the identified policy violation incident. In one embodiment, the processing logic provides a dialog box that allows an administrator to identify one or more attributes to be included in the request to find similar incidents.

In another embodiment, for each attribute, the processing logic generates a list (and/or provides a hyperlink to the list) of policy violation incidents with the same attribute value. In another embodiment, the processing logic receives user input identifying multiple attributes of a policy violation incident, and generates a list of policy violation incidents that share the same attribute value as that of the given violation for every identified attribute (e.g. Policy1(attribute1)==Policy2(attribute1) AND Policy1(attribute2)==Policy2(attribute2)).

Policy violation incidents may happen at a specific time, or may happen as part of a specific scan for policy violation incidents. In the context of a given policy violation incident, an administrator may view other policy violation incidents that are similar to the given policy violation incident with respect to one or more periods of time, or one or more scan sessions. In one embodiment, the periods of time or the scan sessions may be predetermined and automatically included as part of the automatic correlation. In another embodiment, the periods of time or the scan sessions may be specified by the user prior to automatic correlation. The user interface can display the automatic correlation of the identified policy violation incident, as well as trends of policy violations incidents over one or more periods of time or over one or more scan sessions. In one embodiment, when the administrator views the details of a given policy violation incident, the automatic correlations and trending described above may be automatically performed and displayed to the administrator alongside the details of the given policy violation. For example, the processing logic, for each of the attributes of the given policy violation incident, generates a count of the number of other policy violation incidents sharing that particular attribute with the given policy violation incident (e.g., same attribute value). For example, the count of the number of similar policy violation incidents in the last 7 days, last 30 days, and since the system has existed, may be generated, and displayed in the user interface as part of the automatic correlation. For another example, the count of the number of similar policy violation incidents that happened in the last scan, and the count of the number of similar policy violations that happened in all scans, may be generated and displayed in the user interface as part of the automatic correlation. Alternatively, other types of trends may be performed and displayed in the user interface as part of the automatic correlation.

The policy violation incidents can be correlated across many different attributes. The attributes of similarity may be any of the following attributes: 1) attachment name; 2) file name, 3) application database, 4) file owner, 5) message subject, 6) policy, 7) message recipient, 8) message recipient Internet Protocol (IP) address, 9) message sender, 10) message sender address, 11) endpoint user name, 12) host name, or 13) file server. Alternatively, other types of attributes may be used for the identification and automatic correlation of other related incidents.

The incidents may be detected in various scenarios as described below with respect to the listed attributes listed above. For example, an email that violates a policy may have an attachment. The attachment name attribute refers to the name of an attached file. A file on disk or written to a disk may violate a policy. The file name attribute may refer to the name of that particular file. A file or message stored in an application database (e.g., a Lotus Notes® database) may violate a policy. The application database attribute may refer to name, type, and/or location of the application database. A file on disk or written to a disk may violate a policy. The file owner attribute may refer to the owner of that file as recorded by the file system. When a message (e.g., email) violates a policy, the message subject attribute may refer to the subject of that message. It should be noted that this attribute can also be used to find correlated violations based on a substring of the message subject. For example: "High Value Account Numbers" might be correlated to "Re: High Value Account Numbers" and "Fwd: High Value Account Numbers". The policy attribute may refer to the policy that was violated. The message recipient attribute may refer to the recipient (e.g., email address) of that message and the message sender attribute may refer to the sender (e.g., email address) of that message, for example, when a message (e.g., email) violates a policy. A message, such as an HTTP POST, may violate a policy. The recipient IP address attribute may refer to the IP address where the message is directed, and the sender IF address attribute may refer to the IP address where the message originated. Also, when a message, such as an email, violates a policy, the message sender attribute may refer to the sender (e.g., email address) of that message. The detected policy violation incident may also include the user name of the user who violated the policy, since operating system may keep track of the logged-in users. The endpoint user name attribute may refer to the user name of the user who violated the policy. Similarly, the host name attribute may refer to the name of computer (e.g., host computer) where the policy violation incident occurred and the file server attribute may refer to the name of the server where the file, which violates a policy, is located.

As described above with respect to block 303, the detected policy violation incidents are stored according to a pre-defined format. In one embodiment, each of the policy violation incidents is stored in a policy violation database (e.g., policy violation database 214 of FIG. 2) having one or more tables. In one embodiment, the policy violation database also includes a mapping table that specifies where each attribute is stored (e.g., the table name and the column name) and a comparison operator (e.g., strictly equals, case-insensitive equals, or the like) to be used when evaluating the similarity of the attribute values for the particular attribute. Table 1-2 illustrates an exemplary mapping table, according to one embodiment.

TABLE 1-2

Attribute Mapping Table

| Attribute Name | Table Name | Column Name | Comparison Operator |
| --- | --- | --- | --- |

In other embodiments, the detected policy violation incidents may be stored in other pre-defined formats that allow the incident correlation engine 110 to access the attribute values of the policy violation incidents for automatic correlation.

Figure 4A:
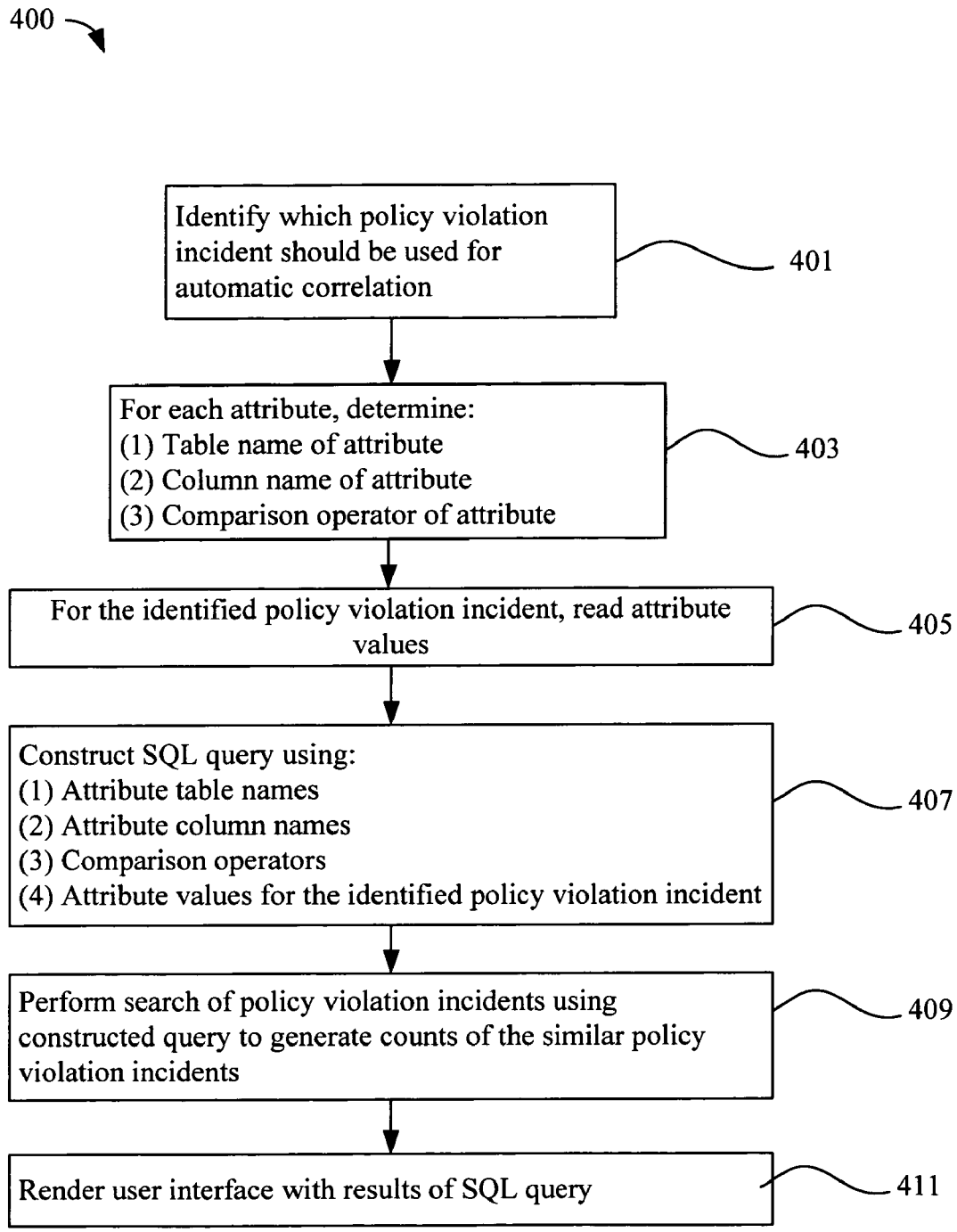
FIG. 4A is a flow diagram of one embodiment of a method for generating a count of the number of incidents that are similar to an identified policy violation incident.
Figure 4B:
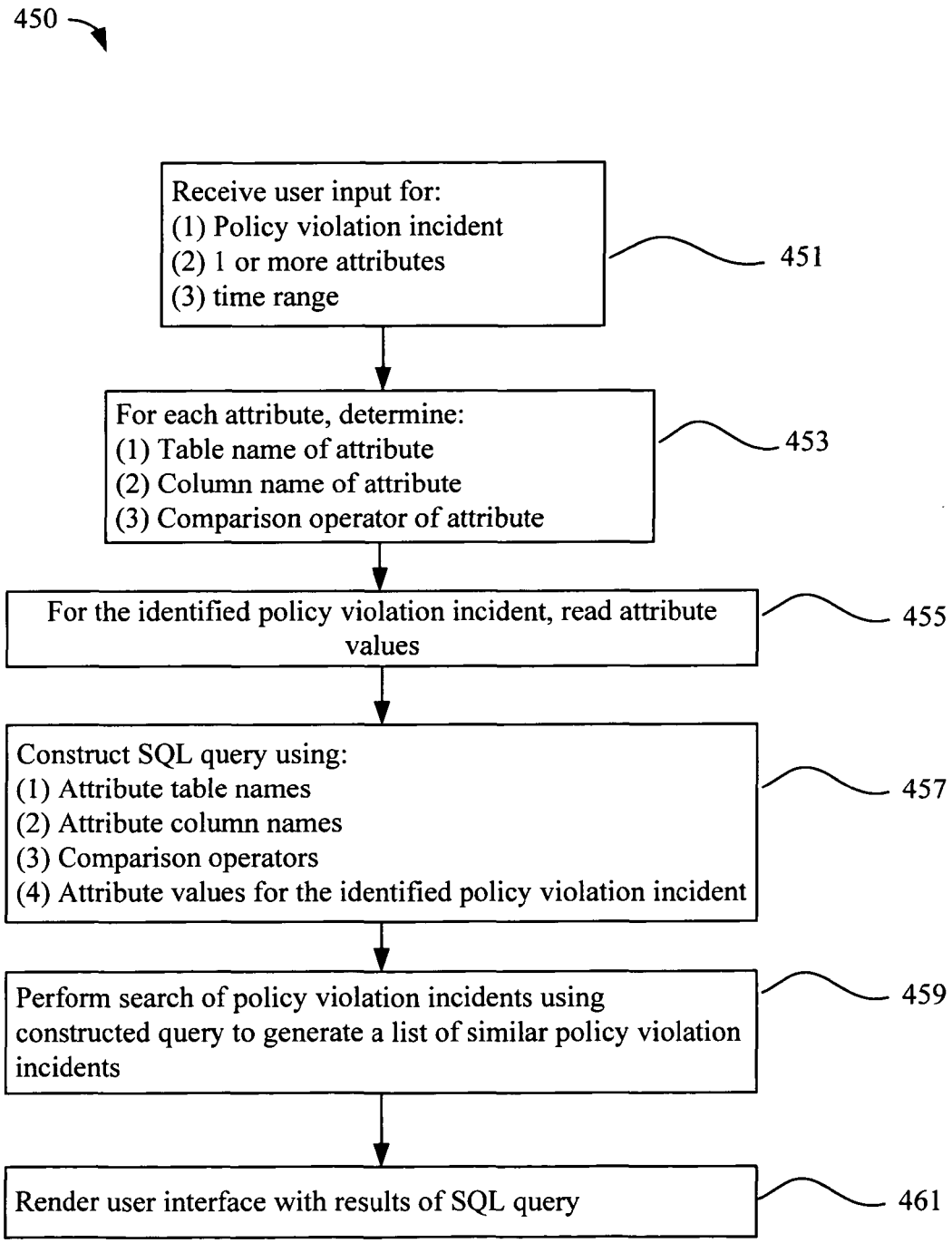
FIG. 4B is a flow diagram of one embodiment of a method for generating a list of incidents that are similar to a given incident.

FIGS. 4A and 4B are flow diagrams of some embodiments of a method for providing correlation information to a user. The method is performed by processing logic that may comprise hardware (circuitry, dedicated logic, etc.), software (such as is run on a general purpose computer system or a dedicated machine), or a combination of both. In one embodiment, the method is performed by an incident correlation engine (e.g., engine 110 of FIG. 1).

Referring to FIG. 4A, method 400 begins with processing logic receiving (block 401) user input identifying which policy violation incident should be used for automatic correlation. Once the policy violation incident has been identified, the processing logic determines (block 403) for each attribute of the policy violation incident, the 1) table name of the attribute, 2), the column name of the attribute, and 3) the comparison operator of the attribute. In one embodiment, the processing logic performs a lookup operation to determine the table name, column name, and comparison operator of the attribute using Table 1-2 discussed above. Next, the processing logic reads (block 405) the attribute values for the identified policy violation incidents. This may be done by performing a lookup operation in the policy violation database using the table name and column name for each of the attributes and reading the attribute values from those locations. Next, the processing logic constructs (block 407) one or more queries (e.g., SQL queries) using the attribute table names, the attribute column names, the comparison operators, and the attribute values for the identified policy violation incident. Next, the processing logic performs a search (block 409) of the policy violation incidents (e.g., stored in the policy violation database 214) using the one or more constructed queries to generate counts of the similar policy violation incidents. In particular, for each attribute, a count of the number of other policy violation incidents that share the particular attribute with the identified policy violation incident may be generated. In one embodiment, a count can be generated for the number of similar policy violation incidents that occurred within a given time period. In another embodiment, a count can be generated for the number of similar policy violations using multiple time periods (e.g., 1 day, 7 days, and 30 days). Next, the processing logic renders a user interface with the results of the one or more queries (block 411). It should be noted that multiple time periods (or scan sessions) may be specified and the search may be performed according to each of the specified time periods (or scan sessions).

In one embodiment, the policy violation incident is identified at block 401 by receiving a user request to perform automatic correlation on the identified policy violation incident. In another embodiment, the policy violation incident is identified at block 401 by the administrator selecting the policy violation incident from a list of policy violations incidents, and the automatic correlation of the selected policy violation is then performed without the user specifically requesting automatic correlation of the policy violation incident. For example, when the administrator selects a policy violation incident to analyze, the user interface displays the results of the automatic correlation automatically alongside the details of the selected policy violation. It should be noted that although the embodiment of FIG. 4A performs automatic correlation of a single identified policy violation incident, in other embodiments, multiple policy violation incidents may be identified for automatic correlation. It should also be noted that the method 400 of FIG. 4A is used to generate the counts of similar incidents for each of the attributes of the identified policy violation incidents.

In one embodiment, the identified policy violation incident is a policy violation that was detected in a message. The message may have one or more attributes that can be used for automatic correlation, including, for example, one or more of the following attributes: 1) a message recipient attribute that is representative of an email address of a recipient of the message that triggered the policy violation incident; 2) a recipient address attribute that is representative of a network address (e.g., IP address) of the recipient of the message that triggered the policy violation incident; 3) a message sender attribute that is representative of an email address of a sender of the message that triggered the policy violation incident; 4) a sender address attribute that is representative of a network address (e.g., IP address) of the sender of the message that triggered the policy violation incident; 5) a message subject attribute that is representative of a subject of the message that triggered the policy violation incident; 6) an attachment name attribute that is representative of an attached file of the message that triggered the policy violation incident, or the like.

In one embodiment, the processing logic is configured to correlate a substring of the message subject attribute with a substring of the message subject attribute of the other policy violation incidents. For example, a message with a subject, including "Re: The list we talked about," may be correlated with other policy violation incidents that contain the similar subject (e.g., "Re: Re: The list we talked about," "Fwd: The list we talked about," or "Update on the list we talked about). This may be done by correlating a substring "The list we talked about" with substrings of the other policy violation incidents (e.g., "the list we talked about).

In another embodiment, the identified policy violation incident is a policy violation incident that was detected in a message or a file. The message or file may have one or more attributes that can be used for automatic correlation, including, for example, one or more of the following attributes: 1) a policy type attribute that is representative of a policy type of the policy violation incident; 2) a user name attribute that is representative of the name of a user (e.g., endpoint user name or logged-in user) that triggered the policy violation incident; 3) a host name attribute that is representative of a name of a computer where the policy violation incident occurred; 4) a file server name attribute that is representative of a name of a server where the policy violation incident occurred; 5) a file name attribute that is representative of a name of a file that triggered the policy violation incident; 6) a file owner attribute that is representative of a name of an owner of the file that triggered the policy violation incident; or 7) a database attribute that is representative of a name of a database in which a file or a message that triggered the policy violation incident is stored. The attributes may also be a sender, a recipient, a user, a source address (e.g., IP address, email address, or the like), destination address (e.g., IP address, email address, or the like), a location, a server, a file type, a media type, a subject, an attachment name or type, an extension of a file, or the like.

As part of the automatic correlation, the processing logic may generate, for each of the counts presented at block 411, a list of the other policy violation incidents that have in common the particular attribute corresponding to the particular count, and link each of the counts to the corresponding list of the other policy violation incidents. The list may be generated using the operations described below with respect to FIG. 4B.

Referring to FIG. 4B, method 450 may start with processing logic receiving (block 451) user input. In the depicted embodiment, the user input includes 1) an identified policy violation incident, 2) one or more attributes of the identified policy to correlate, and 3) a time range. The one or more policy attributes specify which attribute of the identified policy violation incident, the user wishes to correlate and the time range specifies a time window in which the other policy violation incidents occurred. The time range may further restrict the amount of correlated results returned. It should be noted, however, that the time period may be the entire life of the system, which would allow all policy violation incidents meeting the attribute criteria to be correlated. Once the policy violation incident has been identified, the processing logic determines (block 453) for each attribute of the policy violation incident, the 1) table name of the attribute, 2) the column name of the attribute, and 3) the comparison operator of the attribute. In one embodiment, the processing logic performs a lookup operation to determine the table name, column name, and comparison operator of the attribute. Next, the processing logic reads (block 455) the attribute values for the identified policy violation incidents. This may be done by performing a lookup operation in the policy violation database using the table name and column name for each of the attributes and reading the attribute values from those locations. Next, the processing logic constructs (block 457) a query (e.g., SQL query) using the attribute table names, the attribute column names, the comparison operators, and the attribute values for the identified policy violation incident. Next, the processing logic performs a search (block 459) of the policy violation incidents (e.g., stored in the policy violation database 214) using the constructed query to generate a list of the similar policy violation that satisfy the user input conditions specified. In particular, the list includes similar policy violations that have in common the one or more identified attributes with the identified policy violation incident within the given time range. Next, the processing logic renders a user interface with the results of the query (block 461).

In one embodiment, the method 450 is performed in response to a user selecting a given count with the user interface generated by the method 400. In this embodiment, the processing logic receives user input regarding a request to display a list of the other policy violation incidents that correspond to a particular count, and generates the list of other policy violation incidents that corresponds to the count. The user may select the particular count by clicking on a link (e.g., generated by the processing logic). Once the user has selected the given count, which specifies the 1) policy violation incident, 2) the particular attribute, and 3) the time range (block 451), the method performs the operations at blocks 453-461, as described above, to generate and display the list of similar incidents. Alternatively, the lists for each of the counts may be have been automatically generated when the counts were generated, and may be accessed by clicking on the link, which associates the particular count with the corresponding list.

In another embodiment, the method 450 is performed in response to a user request to find similar incidents. In this embodiment, the processing logic also receives user input identifying one or more attributes of the given policy violation. In response to receiving the request, the processing logic constructs a query to search the incident data repository 114 for the similar policy violation incidents that occurred within the given time period and that share the similar attribute with the particular attribute of the given policy violation incident. Using the constructed query, the processing logic searches the incident data repository 114, and the search results are used to generate a list of similar policy violation incidents that occurred within the given time period and that share the one or more identified attributes with the identified policy violation incident. For example, the user interface which presents the counts for the attributes of the identified policy violation incident may also present a button, which opens a dialog box when activated, such as the "Find Similar" button of FIG. 5A. The dialog box may allow a user to identify one or more correlation parameters, such as specific attributes to be included in the search of similar incidents, and specific attribute values for those specific attributes. Alternatively, other types of user interface elements may be used to facilitate user input of the particular attributes and the corresponding attribute values. Once the user has selected the specific attributes and the corresponding attribute values, the method performs the operations at blocks 453-461, as described above, to generate and display the list of similar incidents.

In one embodiment, the processing logic performs automatic correlation of the policy violation incidents that have in common two or more attributes with the identified policy violation incident. For example, the user may select two attributes, such as the sender and recipient attributes of the identified policy violation incident, and the processing logic performs the automatic correlation for other incidents that share the same two identified attributes. The user may also specify which operator to use when selecting more than one attribute. For example, the user may specify an AND operator, an exclusive or (XOR) operator, an OR operator, or the like.

In another embodiment, the processing logic begins by receiving user input identifying a given policy from multiple stored policy violation incidents (e.g., stored in the incident data repository 114). Once the processing logic has received the user input, the processing logic generates a table having one axis represent a given time period and another axis represent attributes of the given policy violation incident, such as illustrated in the GUI 500 of FIG. 5A. The processing logic, for each attribute of the table, generates a count of the number of similar policy violation incidents that occurred within the given time period and that share a similar attribute with the particular attribute of the given policy violation incident. In one embodiment, the processing logic generates each of the counts by constructing a query to search the incident data repository 114 for the similar policy violation incidents that occurred within the given time period and that share the similar attribute with the particular attribute of the given policy violation incident. Using the constructed query, the processing logic searches the incident data repository 114 and counts the number of similar policy violation incidents in the search results to generate the count for each of the counts.

Figure 5A:
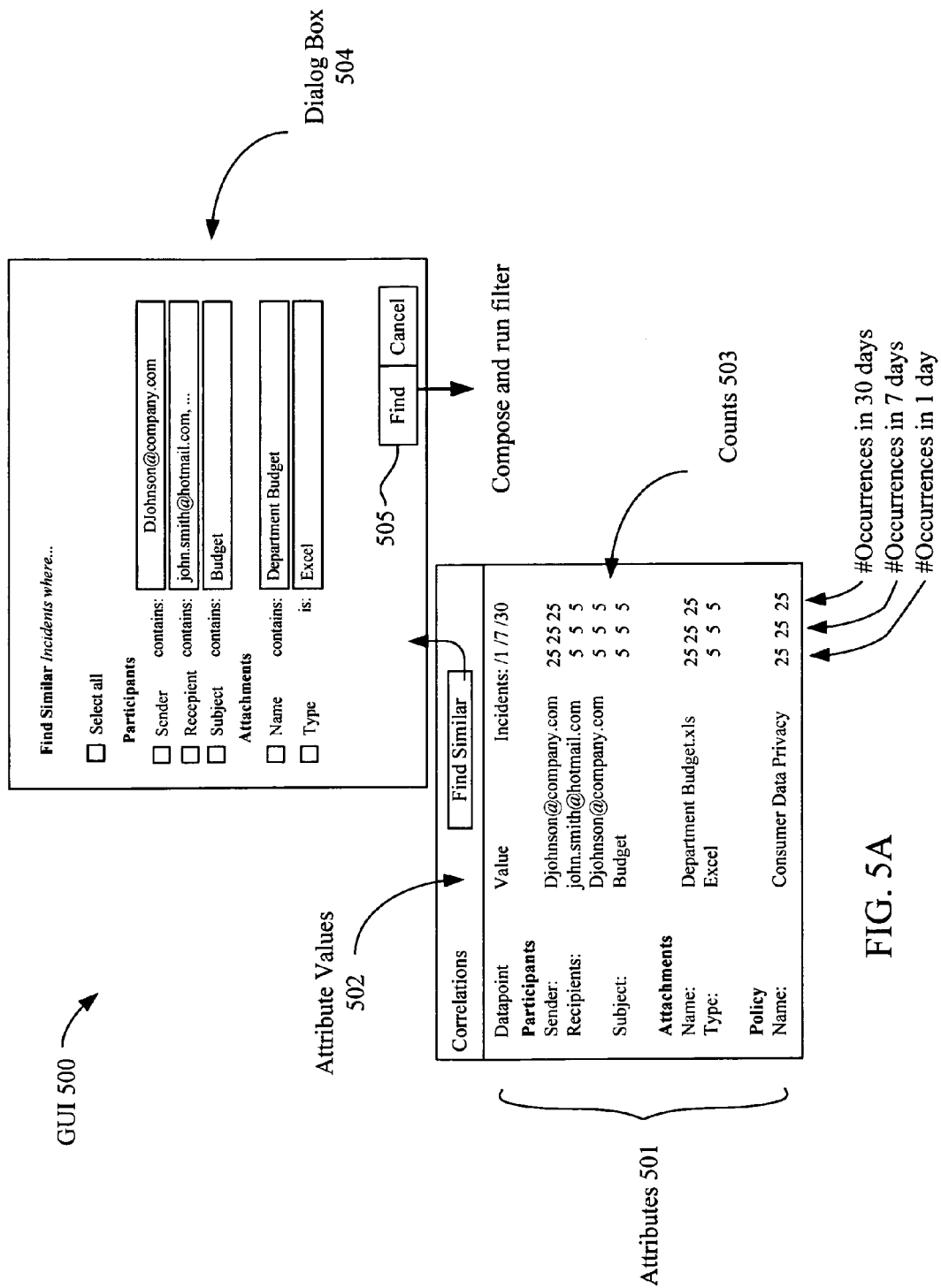
FIG. 5A is an exemplary graphical user interface (GUI) that illustrates the generated counts of the number of incidents that are similar to an identified policy violation incident along the time axis and at least one attribute axis, according to one embodiment.

FIG. 5A is an exemplary GUI 500 that illustrates the generated counts of the number of incidents that are similar to an identified policy violation incident along the time axis and at least one attribute axis, according to one embodiment. The GUI 500 illustrates attributes 501, attribute values 502, and counts 503 of an identified policy violation incident. The attributes 501 include various data points, such as the participant attributes, including sender, recipient, and subject, attachment attributes, including name and type, and policy attributes, including the policy name. The attributes may also be grouped based on the type of attributes; for example, the participant attributes of sender, recipient, and subject are grouped together under a participants heading. The GUI 500 also includes the corresponding values for each of the attributes, as well as the counts 503 for three given time periods, namely the counts 503 for one day, seven days, and 30 days. The counts 503 represent the total number of occurrences for the given time periods (e.g., 1 day, 7 days, and 30 days). The counts 503 are presented in occurrence columns, where each number in the column represents the total number of occurrences where the single attribute matched within the given time period. In one embodiment, each number of the counts 503 is hyperlinked. Upon selection or activation of the hyperlink, a filter for the exact attribute match in the column's time span may be executed and the results may be displayed. Alternatively, the hyperlink may link to a generated list, which includes the list of occurrences that match the particular attribute within the given time period. The operations described with respect to FIG. 4A may be used to generate the user interface displayed in GUI 500.

The GUI 500 also includes a find similar button (that can be activated to find similar incidents), which opens a dialog box or a new window 504. The dialog box 504 allows a user to specify which attributes should be used for correlation. In the depicted embodiment, the various attributes of the identified policy violation incident are already present in the fields (e.g., "DJohnson@company.com" in the sender attribute field) of the dialog box 504. These fields allow a user to select which attributes to include in the correlation, as well as further specify the data values of the identified attributes. Once the user has identified one or more attributes and the corresponding values for those attributes, the user can initiate the execution of the filter by, for example, activating the "Find Similar" button 505. Upon activation, a query is constructed using the specified information, as described herein, to generate a list of the similar incidents, such as illustrated in FIG. 5B.

FIG. 5B is an exemplary GUI 550 that illustrates the generated list 551 of incidents that are similar to a given incident along the time axis and attribute axis, according to one embodiment. The GUI 550 displays may be configured to display various information about the incidents of the generated list 551, such as the type of incident (email), the identified attributes (e.g., subject, sender, recipient attributes), date/time of detection, an identifier and the name of the policy being violated, the status of the incident, how many matches detected within the incident, and the severity of the incident. In other embodiments, more or less information about the listed incidents may be provided in the generated list 551. The GUI 550 also allows one or more of the listed incidents to be selected using the check box 552. Also, the GUI 550 may provide a button 553 to request that specific incident actions be performed for incidents selected via corresponding check boxes 552. In addition, the GUI 550 ma optionally provide a graph 554 of the number of incidents for a given time period. The operations described with respect to FIG. 4B may be used to generate the user interface displayed in GUI 550.

Figure 6:
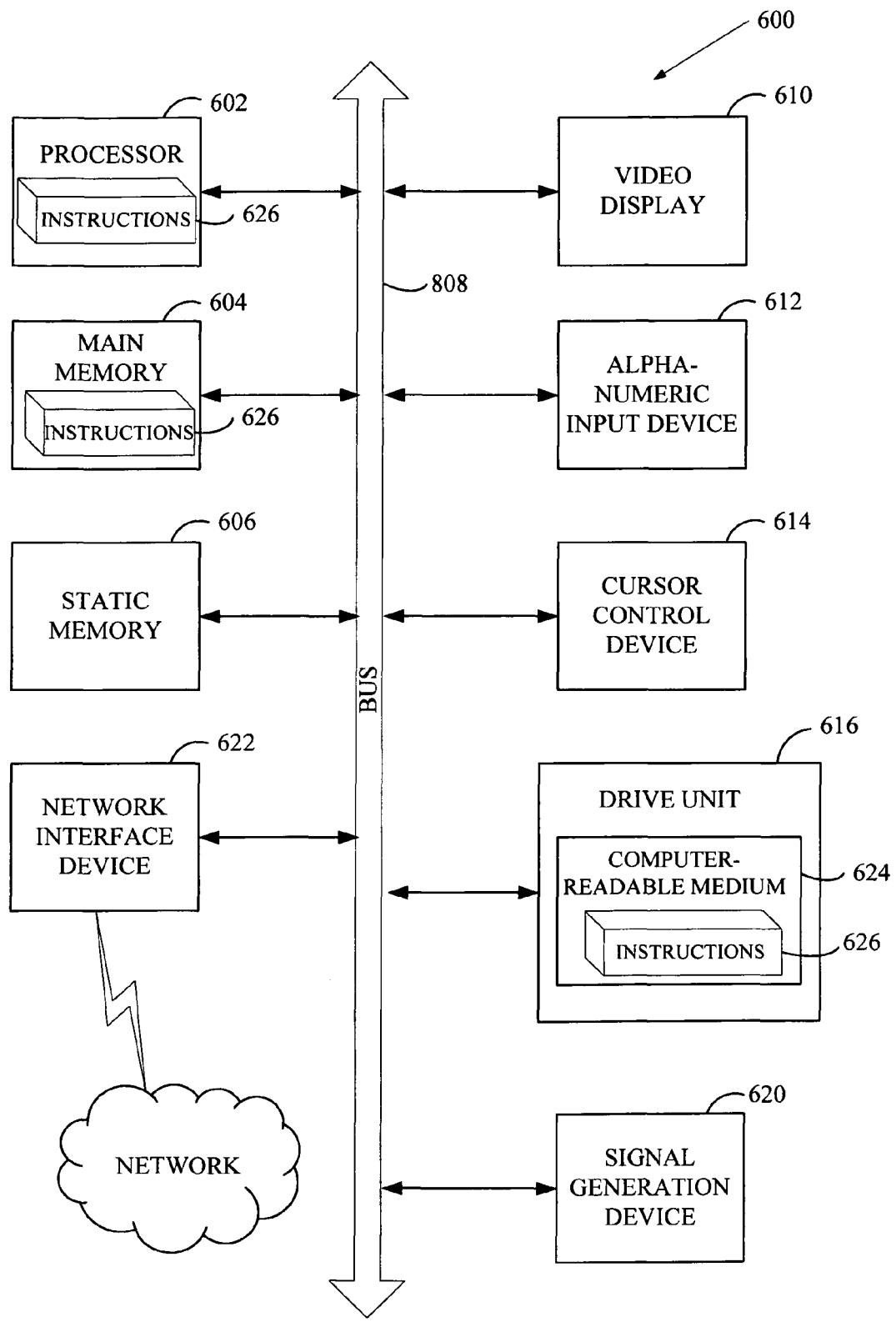
FIG. 6 illustrates a diagrammatic representation of a machine in the exemplary form of a computer system within which a set of instructions, for causing the machine to perform any one or more of the methodologies discussed herein, may be executed

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers)

that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium may include, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable storage medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating mariner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

We claim:

1. A computer-implemented method, comprising:
   identifying a plurality of incidents of violations of a policy upon detecting presence of confidential information in a plurality of messages;
   storing the plurality of violation incidents of the policy in a data repository, wherein each of the plurality of violation incidents is associated with a plurality of message attribute values;
   receiving a user request to correlate one of the plurality of violation incidents of the policy stored in the data repository to other incidents of the plurality of violation incidents of the policy based on at least one common message attribute value, the user request specifying the at least one common message attribute value associated with the violation incident to be correlated;
   in response to the user request, automatically correlating a requested violation incident with the other incidents of the plurality of violation incidents of the policy based on the at least one specified common message attribute value, wherein automatically correlating comprises searching the data repository using the at least one common message attribute value and finding other violation incidents of the policy having the at least one message attribute value;
   displaying the at least one message attribute value of the requested violation incident; and
   for each of the at least one message attribute value, displaying a count of the number of other violation incidents of the policy that have in common the message attribute value with the requested violation incident.

2. The method of claim 1, wherein the plurality of policy violation incidents are incidents of storing or transmitting confidential information that violate one or more data loss prevention policies.

3. The method of claim 1, wherein automatically correlating comprises:
   generating a list of the plurality of message attribute values of the requested violation incident; and
   for each of the plurality of message attribute values of the list, generating a count of the number of other violation incidents of the policy that have in common the message attribute value with the requested violation incident.

4. The method of claim 1, wherein the plurality of violation incidents has one of a plurality of incident types, each of the plurality of incident types having a corresponding plurality of message attributes, the plurality of incident types comprising hypertext transfer protocol (HTTP), instant messaging (IM), simple mail transfer protocol (SMTP), network news transfer protocol (NNTP), unidirectional transmission control protocol (uTCP), file transfer protocol (FTP), and removable media.

5. The method of claim 1, further comprising:
   receiving a user request to display a list of the other violation incidents of the policy that correspond to a particular count; and
   generating the list of the other violation incidents of the policy corresponding to the particular count to be displayed upon receiving the request.

6. The method of claim 1, further comprising:
   receiving user input regarding a request to find similar incidents according to one or more user-identified message attributes of the requested violation incident; and
   generating a list of the similar incidents that share a value of the one or more user-identified message attributes with the requested violation incident.

7. The method of claim 1, wherein automatically correlating the violation incident comprises correlating the violation incident with the other violation incidents of the policy that occurred within a given time period.

8. The method of claim 1, wherein automatically correlating the violation incident comprises correlating the violation incident with the other violation incidents of the policy that were detected during a scan session.

9. The method of claim 1, wherein the requested violation incident is a violation detected in a message, and wherein the plurality of message attribute values comprise values of one or more of the following:
   a message recipient attribute that is representative of an email address of a recipient of the message that triggered the violation incident of the policy;

a recipient address attribute that is representative of a network address of the recipient of the message that triggered the violation incident of the policy;

a message sender attribute that is representative of an email address of a sender of the message that triggered the violation incident of the policy;

a sender address attribute that is representative of a network address of the sender of the message that triggered the violation incident of the policy;

a message subject attribute that is representative of a subject of the message that triggered the policy violation incident of the policy; or an attachment name attribute that is representative of an attached file of the message that triggered the violation incident of the policy.

10. The method of claim 1, wherein the requested violation incident is a violation detected in a message or a file, and wherein the plurality of message attribute values comprise values of one or more of the following:

a policy type attribute that is representative of a policy type of the violation incident of the policy;

a user name attribute that is representative of a user name of a user that triggered the violation incident of the policy;

a host name attribute that is representative of a name of a computer where the violation incident of the policy occurred;

a file server name attribute that is representative of a name of a server where the violation incident of the policy occurred;

a file name attribute that is representative of a name of a file that triggered the violation incident of the policy;

a file owner attribute that is representative of a name of an owner of the file that triggered the violation incident of the policy; or a database attribute that is representative of a name of a database in which a file or a message that triggered the violation incident of the policy is stored.

11. The method of claim 1, wherein automatically correlating the violation incident comprises:

for each of the at least one message attribute value of the requested violation incident, performing a lookup operation to determine an attribute table name, an attribute column name, and a comparator operator;

reading the message attribute values corresponding to the particular message attribute;

constructing a query using the attribute table name, the attribute column name, the comparator operator, and the read attribute value for the particular message attribute;

performing a search within the incident data repository for other violation incidents of the policy using the constructed query; and generating a count of the number of number of other violation incidents of the policy returned from the particular search.

12. The method of claim 1 wherein displaying the at least one message attribute value of the requested violation incident and displaying a count comprises:

displaying a table having one axis represent a given time period and another axis represent the plurality of message attribute values of the requested violation incident; and for each message attribute value of the table, displaying a count of the number of similar violation incidents of the plurality of stored violation incidents of the policy that occurred within the given time period and that share a similar message attribute value with a relevant message attribute value of the requested violation incident.

13. The method of claim 12, further comprising:

providing links for each of the counts;

for each of the links, providing a list of the similar violation incidents of the plurality of stored violation incidents of the policy that occurred within the given time period and that share the similar message attribute value with the particular message attribute value of the requested violation incident when the link is selected by the user.

14. An apparatus, comprising:

memory to store a plurality of violation incidents of a policy, wherein each of the plurality of violation incidents is associated with a plurality of message attributes values;

a processor, coupled to the memory, to identify the plurality of violation incidents of the policy upon detecting presence of confidential information in a plurality of messages, to provide a user interface to receive a user request to correlate one of the plurality of stored violation incidents of the policy in the memory to other incidents of the plurality of violation incidents of the policy based on at least one common message attribute value, the user request specifying the at least one common message attribute value associated with the violation incident to be correlated; and a correlation engine, executed by the processor, to automatically correlate a requested violation incident with the other incidents of the plurality of violation incidents of the policy based on the at least one specified common message attribute value, wherein to automatically correlate comprises searching the memory using the at least one common message attribute value and finding other violation incidents of the policy having the at least one message attribute value, wherein the user interface is to present resulting correlation information to a user in response to receiving the user input identifying one of the plurality of stored policy violation incidents display the at least one message attribute value of the requested violation incident and for each of the at least one message attribute value, display a count of the number of other violation incidents of the policy that have in common the message attribute value with the requested violation incident.

15. The apparatus of claim 14, wherein the plurality of violation incidents has one of a plurality of incident types, each of the plurality of incident types having a corresponding plurality of message attributes, the plurality of incident types comprising hypertext transfer protocol (HTTP), instant messaging (IM), simple mail transfer protocol (SMTP), network news transfer protocol (NNTP), unidirectional transmission control protocol (uTCP), file transfer protocol (FTP), and removable media.

16. The apparatus of claim 14, wherein the user interface is to provide a link for each of the counts, wherein the correlation engine is configured to generate a list of the other violation incidents of the policy corresponding to the count when the link for the particular count is activated.

17. The apparatus of claim 14, wherein the correlation engine is to receive from the user through the user interface a request to find similar incidents according to one or more user-identified message attributes of the requested violation incident, and to generate a list of the similar incidents that share a value of the one or more user-identified message attributes with the requested violation incident.

18. A non-transitory computer-readable storage medium having instructions stored thereon that when executed by a computer cause the computer to perform a method comprising:
- identifying a plurality of incidents of violations of a policy upon detecting presence of confidential information in a plurality of messages;
- storing the plurality of violation incidents of the policy in a data repository, wherein each of the plurality of violation incidents is associated with a plurality of message attribute values;
- receiving a user request to correlate one of the plurality of violation incidents of the policy stored in the data repository to other incidents of the plurality of violation incidents of the policy based on at least one common message attribute value, the user request specifying the at least one common message attribute value associated with the violation incident to be correlated;
- in response to the user request, automatically correlating a requested violation incident with the other incidents of the plurality of violation incidents of the policy based on the at least one specified common message attribute value, wherein automatically correlating comprises searching the data repository using the at least one common message attribute value and finding other violation incidents of the policy having the at least one message attribute value with;
- displaying the at least one message attribute value of the requested violation incident; and
- for each of the at least one message attribute value to be correlated, displaying a count of the number of other violation incidents of the policy that have in common the message attribute value with the requested violation incident.

19. The non-transitory computer-readable storage medium of claim 18, wherein automatically correlating comprises:
- generating a list of the plurality of message attribute values of the requested violation incident; and
- for each of the message attribute values of the list, generating a count of the number of other violation incidents of the policy that have in common the particular message attribute value with the requested violation incident.

* * * * *